2,897,096
PROCESS OF LINING THE INTERIOR OF A METAL CONTAINER WITH ACID-RESISTANT COATING

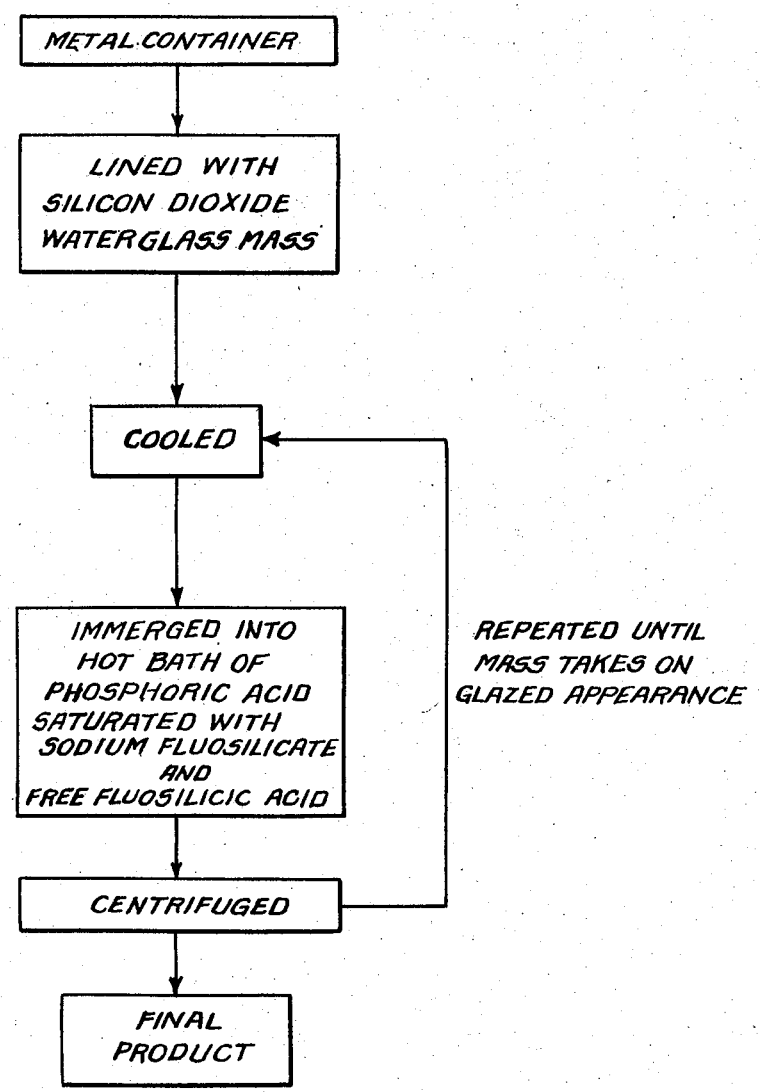

Alexander Karatzas, New Halkidon, Athens, and Marina Hondropoulou, Piraeus, Greece Application October 13, 1955, Serial No. 540,354

2 Claims. (Cl. 117—70)

It is known that an acid-resistant mass consisting of a mixture of finegrained silicon dioxide and potassium or sodium water-glass (acid-resistant cement) is used nowadays as a binder for acid-resistant bricks.

Heretofore, this material could be used neither in lining such devices as pumps ventilators, agitators, and the like, nor in lining containers to be employed as tanks for storing acids, or as vessels for carrying out acidic chemical reactions.

As a matter of fact, the mass of the above composition exhibits two main disadvantages rendering it unsuitable for the uses set forth above.

Under the most favourable proportions of mixing and fineness of the materials used, the set mass consisting of silicon dioxide and water-glass (acid-resistant cement) possesses such a high porosity, that isolation of the acidic liquid contained in the lined vessel from the surface of the base metal is quite impossible.

The acidic liquid penetrating through the pores of the mass attacks the base metal of the container causing corrosion, evolution of gases and separation of the lining from the base metal.

On the other hand, owing to the fact that coefficients of expansion of the set mass having the composition stated above, and the base metal, usually iron, are quite different, severe tensions are created, during temperature variations, in a lining made of this mass, causing cracks or fissures to be formed in the mass, through which the acidic liquid can penetrate and promote corrosion.

It is an object of the present invention to provide processes eliminating these drawbacks, thus permitting the acid-resistant cement (mixture of silicon dioxide and potassium or sodium water-glass) to be employed as a lining-means for reactors made of iron or other metal; for containers to be used as tanks for acidic corrosive liquids; and for such metallic devices as pumps, ventilators, agitators and the like, as are used in chemical reactions.

To obtain elimination of the high porosity of the mass our invention utilizes three different processes which are as follows.

*First process.*—Formation and deposition on the lining, by chemical means, of salts resisting the action of the acid are to be employed. For example, pumps, agitators etc. lined with this mass and used in the production of phosphoric acid by the wet process (phosphate rock and sulphuric acid) can be made acid-resistant by forming and depositing sodium fluosilicate within the pores of the mass. A lined metallic surface treated in this way, can withstand the action of phosphoric acid on account of the fact that phosphoric acid produced by the wet process is always saturated with sodium fluosilicate. Thus, the pores of the mass filled with this salt remain impervious, and there is no danger of the salt within the pores being dissolved. It is to be noted that this result could not be obtained by the simple addition of sodium fluosilicate, or like salt, to the silicon dioxide-water glass (acid-resistant cement) during its production. Such an addition would accelerate, it is true, setting of the mass but would not contribute at all to the reduction of its porosity.

In this procedure, as illustrated by the drawing, the lined metallic surface is first cooled and then immerged into a hot phosphoric acid bath saturated with sodium fluosilicate and which also contains, small quantities of free fluosilicic acid and The lined surface is thereupon immediately removed from the bath and subjected to centrifugation to eliminate any excess liquid. This treatment is repeated until a glazy appearance is imparted to the external surface of the mass.

By proceeding in analogous manner we can fill the pores of the mass with other salts, as for example calcium fluosilicate or calcium fluoride (to withstand the action of phosphoric acid) or sodium chloride (to withstand the action of hydrochloric acid), etc.

*Second process.*—In this second process, tightening of the pores of the mass consisting of silicon dioxide and water glass (acid-resistant cement) is obtained by filling the pores with plastics, resins or bituminous substances, that are resistant to the intended use.

The originality of this second process lies mainly in the manner of its application and not in the use itself of the materials employed for tightening the pores of the mass.

This application is performed in special vacuum vessels provided with means for air-tight closing. The lined metallic surface to be treated is introduced in this vessel, the latter tightly closed and the air removed by means of a high vacuum pump. Thus, any air contained within the pores of the mass is eliminated. A special vaporizer, operated from the outside of the vacuum vessel, is then used to apply on the lined surface under treatment, the material which will effect filling of the pores of the mass, this material being used in dissolved or melted form. Before applying the vacuum, it is of course necessary to bring, using hot air, the lined metallic surface treated to about the same temperature as that of the material to be applied on it by vaporization. Perfect filling and tightening of the pores of the mass consisting of silicon dioxide and water-glass (acid-resistant cement) is thus obtained by this second process, using plastics, resins, or bituminous materials.

*Third process.*—According to this third process, filling of the pores of the mass consisting of a mixture of silicon dioxide and water-glass (acid-resistant cement) is effected by applying on it plastics, resins or bituminous substances reduced in a form of finely divided powder. The same procedure is followed here as in the second process to introduce the lined metallic surface in the vacuum-vessel and evacuate the air. At this point, the finely divided powder consisting of plastics, resins or bituminous substances is allowed to rush into the vessel until the lined surface is entirely covered with the fine powder. Air-pressure (6–10 atm.) is then applied on the interior of the vessel after which pressure is released and the thus treated lined surface subjected to heat or chemical treatment to cause swelling of the material deposited within the pores.

With regard to the second drawback exhibited by the mass consisting of silicon dioxide and water-glass (acid-resistant cement), i.e. the cracks and fissures generated because of the different coefficient of expansion between said mass and the base-metal of the containers or devices, this difficulty may be overcome.

(*a*) By using suitable metal alloys having low coefficient of expansion;

(*b*) By the addition into the mixture consisting of silicon dioxide and water-glass (acid-resistant cement), during its preparation, of plastics, resins, bituminous substances, or graphite, in the form of powder;

(c) By the following treatment: the lined surface of the vessel or device is alternately heated and cooled repeatedly within the range of temperature variations to which it will be normally subjected in operation. In this way, cracks or fissures caused to be formed on the surface of the lining mass are subsequently filled and tightened along with the natural pores of the mass according to any one of the processes 1 to 3, above.

Resort may be had to such modifications and equivalents as fall within the spirit of the invention and the scope of the appended claims.

Having described our invention, we claim:

1. A method of treating a set mass consisting of silicon dioxide-water glass to eliminate the high porosity thereof which comprises the formation and deposition within the pores of said set mass of silicon dioxide-water glass, of sodium fluosilicate, said formation and deposition being obtained by immersing the set mass into a hot solution of phosphoric acid saturated with sodium fluosilicate and fluosilicic acid.

2. The process which comprises, after lining the interior surface of a metal container with silicon dioxide-water glass mass and allowing the same to cool, immersing the lined metallic surface into a hot phosphoric acid bath saturated with sodium fluosilicate and fluosilicic acid, immediately removing the same from the bath and centrifuging to eliminate excess liquid, then repeating the treatment until a glazy appearance is imparted to the external surface of the mass.

References Cited in the file of this patent

UNITED STATES PATENTS

| | | |
|---|---|---|
| 82,202 | Boyle | Sept. 15, 1868 |
| 1,187,746 | Kirchenbauer | June 20, 1916 |
| 1,937,417 | Wallace | Nov. 28, 1933 |
| 1,965,646 | Ihrig | July 10, 1934 |
| 2,114,696 | Ward | Apr. 19, 1938 |
| 2,355,474 | Shepard | Aug. 8, 1944 |
| 2,530,320 | Abraham | Nov. 14, 1950 |

FOREIGN PATENTS

| | | |
|---|---|---|
| 124,609 | Australia | July 3, 1947 |
| 679 | Great Britain | of 1898 |